(12) United States Patent
Kikuchi

(10) Patent No.: US 12,120,362 B2
(45) Date of Patent: Oct. 15, 2024

(54) LIVE STREAM VIEWABLE WHILE SENDING AND RECEIVING TEXT IN GROUP AND AMONG GROUPS

(71) Applicant: Rakuten Group, Inc., Tokyo (JP)

(72) Inventor: Ko Kikuchi, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 0 days.

(21) Appl. No.: 17/921,841

(22) PCT Filed: May 26, 2022

(86) PCT No.: PCT/JP2022/021653
§ 371 (c)(1),
(2) Date: Oct. 27, 2022

(87) PCT Pub. No.: WO2023/228388
PCT Pub. Date: Nov. 30, 2023

(65) Prior Publication Data
US 2024/0244276 A1 Jul. 18, 2024

(51) Int. Cl.
*H04N 21/2187* (2011.01)
*H04L 51/046* (2022.01)
*H04L 51/212* (2022.01)
*H04N 21/254* (2011.01)
*H04N 21/258* (2011.01)
*H04N 21/4788* (2011.01)

(52) U.S. Cl.
CPC ....... *H04N 21/2187* (2013.01); *H04L 51/046* (2013.01); *H04L 51/212* (2022.05); *H04N 21/2542* (2013.01); *H04N 21/25891* (2013.01); *H04N 21/4788* (2013.01)

(58) Field of Classification Search
CPC .......... H04N 21/2187; H04N 21/2542; H04N 21/25891; H04N 21/4788; H04L 51/046; H04L 51/212
See application file for complete search history.

(56) References Cited

U.S. PATENT DOCUMENTS

| 2017/0255439 A1* | 9/2017 | Grosse-Puppendahl ..................... G06F 3/1407 |
| 2023/0027310 A1* | 1/2023 | Muralidharan ....... G06F 40/166 |

FOREIGN PATENT DOCUMENTS

JP 2018-026152 A 2/2018

* cited by examiner

*Primary Examiner* — Chenea Davis
(74) *Attorney, Agent, or Firm* — Sughrue Mion, PLLC

(57) ABSTRACT

A streamer terminal (102) makes (122), upon receiving text, the text appear in a screen, determines (123) whether a streamer pays attention to the text, until the text exits from the screen, and executes (124) a predetermined attention process on text-of-attention that the streamer is determined to pay attention to. Each terminal (103) of viewer terminals classified into any one of groups transmits (132) text accepted from a viewer using each terminal to the streamer terminal (102) and another viewing terminals (103) belonging to an identical group, receives (133) text transmitted from another viewer terminal belonging to the identical group, and makes (134) the text appear in a screen. The streamer terminal (102) transmits (124) the text-of-attention to viewer terminals (103) classified in another group, and each terminal of the viewer terminals (103), upon receiving the text-of-attention, makes the text-of-attention appear in the screen.

14 Claims, 15 Drawing Sheets

FIG.7

| TRANSMISSION TIME | ACCOUNT NAME | TEXT No. | TEXT | ATTENTION FLAG |
|---|---|---|---|---|
| 12:24:01 | aaaaa | 11 | Hello, P-san☆ | 0 |
| 12:24:19 | ddddd | 21 | I'm sure it's merely an apple | 0 |
| 12:24:23 | bbbbb | 12 | I'll buy this time too | 0 |
| 12:25:02 | eeeee | 22 | I want to eat at least once | 0 |
| ⋮ | ⋮ | ⋮ | ⋮ | ⋮ |

FIG.8

| TRANSMISSION TIME | ACCOUNT NAME | TEXT No. | TEXT | ATTENTION FLAG |
|---|---|---|---|---|
| 12:24:23 | bbbbb | 12 | I'll buy this time too | 1 |
| 12:25:02 | eeeee | 22 | I want to eat at least once | 1 |
| ⋮ | ⋮ | ⋮ | ⋮ | ⋮ |

FIG.10

| TERMINAL ID | ACCOUNT NAME | PURCHASE HISTORY | VIEWING HISTORY | DOMICILE |
|---|---|---|---|---|
| 103a | aaaaa | 5 times | 12 views | α PREFECTURE |
| 103b | bbbbb | 7 times | 25 views | β PREFECTURE |
| 103c | ccccc | 12 times | 46 views | β PREFECTURE |
| 103d | ddddd | twice | 1 view | γ PREFECTURE |
| 103e | eeeee | once | 0 views | β PREFECTURE |
| 103f | fffff | 0 times | 0 views | β PREFECTURE |
| ⋮ | ⋮ | ⋮ | ⋮ | ⋮ |

142

US 12,120,362 B2

LIVE STREAM VIEWABLE WHILE SENDING AND RECEIVING TEXT IN GROUP AND AMONG GROUPS

CROSS REFERENCE TO RELATED APPLICATIONS

This application is a National Stage of International Application No. PCT/JP2022/021653 filed May 26, 2022.

TECHNICAL FIELD

The present disclosure relates to a live stream viewable while sending and receiving text in a group and among groups.

BACKGROUND ART

In step with the change of a lifestyle, attention has been paid to a sales mode of a commodity and a service, or goods or services, which is called live commerce. In the live commerce, a streamer or a deliverer delivers motion video that introduces a specific commodity or the like, and a viewer viewing the delivered motion video can purchase the commodity or the like online, and can post a comment on the motion video.

For example, Patent Literature 1 discloses a system that enables a viewing user to input text while real-time motion video is being delivered, to execute a text chat with other viewing users, and to communicate with a delivery user who views the text chat.

CITATION LIST

Patent Literature

Patent Literature 1: Unexamined Japanese Patent Application Publication No. 2018-26152

SUMMARY OF INVENTION

Technical Problem

The live commerce differs from so-called TV shopping in which a streamer unilaterally introduces a commodity or the like, in that the live commerce enables a viewer and a streamer to communicate with each other. In this sense, the live commerce is a sales mode that is close to demonstration sales in volume-sales electrical appliance stores, or demonstration sales such as taste-testing sales in supermarkets.

In addition, in the live commerce, there is a case in which a specific streamer, commodity or the like attracts fans, and there is a recent tendency that some fans get lively by text chats while live video is being streamed. If communications become lively among fans, it is considered that a sales promotion effect of the commodity or the like that is introduced in the live video is enhanced, but if many viewers participate in text chats, the amount of text that each viewer receives increases, and it becomes difficult, in some cases, to read text while viewing the motion video.

In order to solve the above problem, the present disclosure aims at providing a technology for enabling each of viewers to properly understand the content of text that is exchanged, even when many viewers have text chats while viewing a live stream.

Solution to Problem

A delivery system according to a first aspect of the present disclosure includes a plurality of viewer terminals to which live video is delivered, the plurality of viewer terminals comprising one or more processors, and a streamer terminal comprising one or more processors and used by a streamer that delivers the live video. At least one of the one or more processors included in the streamer terminal executes a delivery-side reception process, a delivery-side display process, a determination process, and an execution process. In the delivery-side reception process, text posted from a viewer using the viewer terminal is received from the viewer terminal. In the delivery-side display process, when the text is received, the text is made to appear in a screen. In the determination process, whether the streamer pays attention to the text is determined until the text exits from within the screen. In the execution process, a predetermined attention process is executed on text-of-attention that the streamer is determined to pay attention to. The viewer terminals are classified into any one of a plurality of groups. At least one of the one or more processors included in each of the viewer terminals executes an acceptance process, a viewing-side transmission process, a viewing-side reception process, and a viewing-side display process. In the acceptance process, text posted from a viewer using the each terminal is accepted. In the viewing-side transmission process, the accepted text is transmitted to the streamer terminal and another viewing terminals belonging to a group into which the each terminal is classified. In the viewing-side reception process, text transmitted from another viewer terminal belonging to the group into which the each terminal is classified is received. In the viewing-side display process, the received text is made to appear in a screen. In regard to the attention process, in the execution process, the text-of-attention is transmitted to viewer terminals that are classified in a group other than the group into which the viewer terminal, from which the text-of-attention is transmitted, is classified. When the text-of-attention is received in each terminal of the viewer terminals, the received text-of-attention is made to appear in the screen.

A delivery method according to a second aspect of the present disclosure is a delivery method in a delivery system including a plurality of viewer terminals to which live video is delivered, and a streamer terminal used by a streamer that delivers the live video. The streamer terminal receives, from the viewer terminal, text posted from a viewer using the viewer terminal. The streamer terminal makes, when the text is received, the text appear in a screen. The streamer terminal determines whether the streamer pays attention to the text, until the text exits from within the screen. The streamer terminal executes a predetermined attention process on text-of-attention that the streamer is determined to pay attention to. Each terminal of the viewer terminals classified into any one of a plurality of groups accepts text posted from a viewer using the each terminal. Each terminal of the viewer terminals transmits the accepted text to the streamer terminal and another viewing terminals belonging to a group into which the each terminal is classified. Each terminal of the viewer receives text transmitted from another viewer terminal belonging to the group into which the each terminal is classified. Each terminal of the viewer makes the received text appear in a screen. The streamer terminal transmits, in the attention process, the text-of-attention to viewer terminals that are classified in a group other than the group into which the viewer terminal, from which the text-of-attention is transmitted, is classified. Each terminal of the viewer terminals makes, when the text-of-attention is received, the received text-of-attention appear in the screen.

A delivery server according to a third aspect of the present disclosure includes one or more processors and is communicably connected to a plurality of viewer terminals classified in any one of a plurality of groups, and to a streamer terminal used by a streamer that delivers live video, the live video being delivered to the viewer terminals.

At least one of the one or more processors included in the delivery server executes:

a process of receiving, from the viewer terminal, text posted from a viewer using the viewer terminal;

a process of transmitting, when the text is received, the text to the streamer terminal and another viewer terminals belonging to a group into which the viewer terminal, from which the text is transmitted, is classified;

a process of receiving, from the streamer terminal, text-of-attention that the streamer is determined to pay attention to; and a process of transmitting the text-of-attention to viewer terminals that are classified in a group other than the group into which the viewer terminal, from which the text-of-attention is transmitted, is classified.

Advantageous Effects of Invention

According to the present disclosure, each of viewers can properly understand the content of text that is exchanged, even when many viewers have text chats while viewing a live stream.

BRIEF DESCRIPTION OF DRAWINGS

FIG. 7 is an explanatory view illustrating a data structure of text;

FIG. 8 is an explanatory view illustrating an example of a data structure of text-of-attention;

FIG. 10 is an explanatory view illustrating an example of register information registered in a user registerer;

DESCRIPTION OF EMBODIMENTS

Embodiment 1

Figure 1:
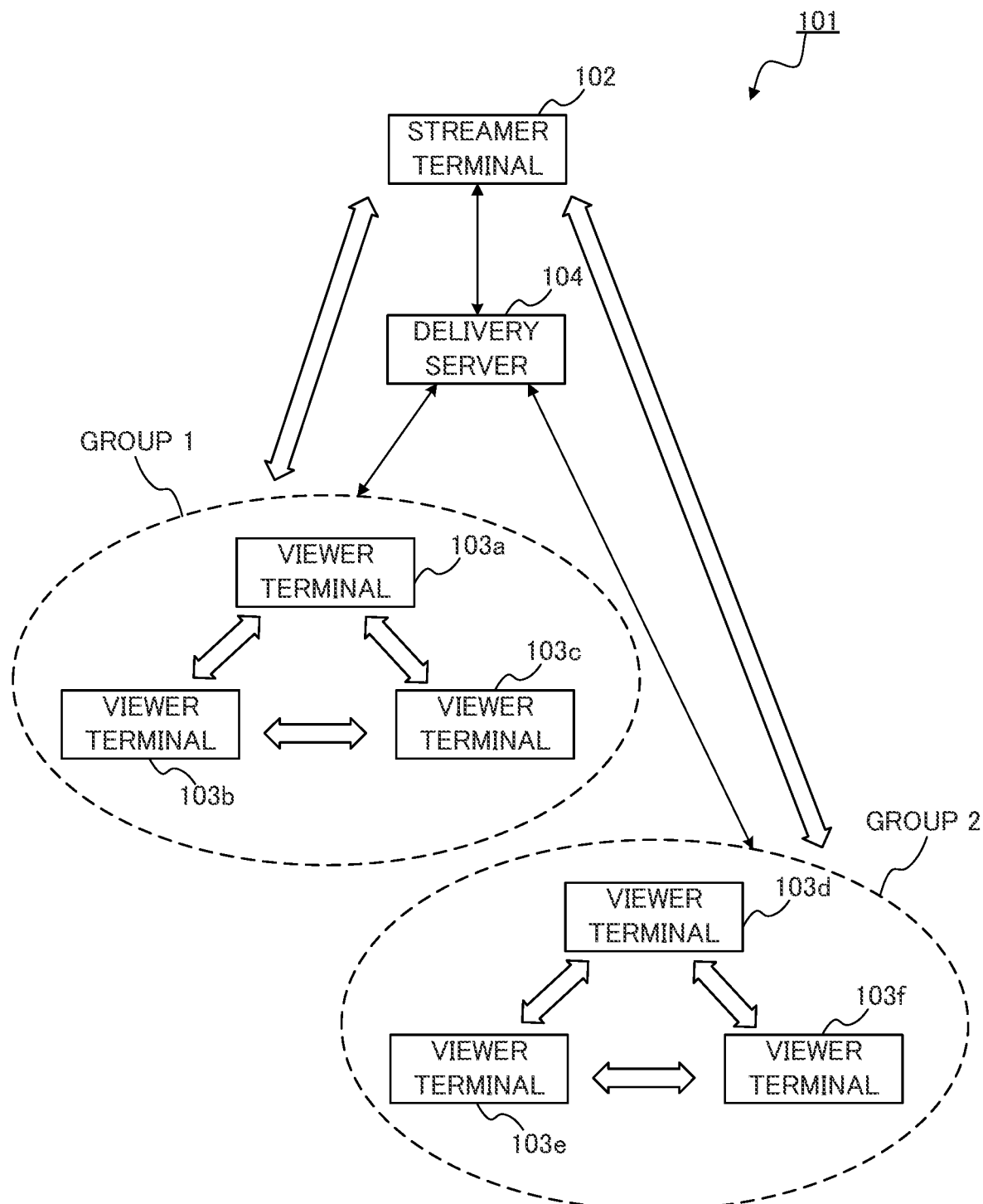
FIG. 1 is an explanatory view illustrating a cooperation of devices that implement a delivery system.

Hereinafter, Embodiment 1 of the present disclosure is described. Note that the present embodiments are intended for descriptions, and do not restrict the scope of the present disclosure. Thus, a person skilled in the art can adopt embodiments in which individual elements or all elements of the embodiments are replaced with equivalent elements, and these embodiments are also included in the scope of the present disclosure.

(Relationship Between Terminal and Server, and Program)

A delivery system according to the present embodiment aims at providing a live stream viewable while sending and receiving text among viewers. The delivery system according to the present embodiment provides a live stream viewable while sending and receiving text among viewers, by one or a plurality of servers cooperating with terminals such as a smartphone, a tablet computer, a personal computer, and the like.

In general, a server and a terminal of the present embodiment are implemented by making a computer execute programs, but purpose-specific electronic circuitry may be made to execute processes.

Besides, as an intermediate mode between the computer and the purpose-specific electronic circuitry, the server and the terminal of the present embodiment can be constituted by applying a technology of a field programmable gate array (FPGA) or the like, which compiles programs into design scripts and dynamically constructs electronic circuitry, based the design scripts.

The server according to the present embodiment is implemented by one or a plurality of server computers, which communicate with a terminal that accepts an instruction for access or the like to a video delivery site that the server provides, executing functions that are implemented by one or a plurality of server programs.

The terminal according to the present embodiment is a terminal computer that implements a smartphone or the like, and can be implemented by executing a terminal program provided via a delivery server or the like from a business operator or an administrator of a delivery service.

As the terminal program, a program equivalent to a so-called "Appli (App)" can be adopted.

Besides, as the terminal program, a general browser can be adopted, and a script program operating on a browser can be adopted as the terminal program.

In these cases, the app or browser operating in the terminal computer functions as an interface for providing a video delivery service to a user, by communicating with the server of the delivery system, which functions as an app server or a Web server.

In general, programs that are executed in the server computer and terminal computer can be recorded in a computer-readable non-transitory recording medium such as a compact disc, a flexible disc, a hard disk, a magneto-optical disc, digital video disc, a magnetic tape, a read-only memory (ROM), an electrically erasable programmable ROM (EEPROM), a flash memory, a semiconductor memory, or the like. This information recording medium can be distributed and sold independently from the server computer and terminal computer.

In the server computer or terminal computer, the program recorded in the non-transitory information recording medium such as a flash memory or a hard disk is read out to a random access memory (RAM) that is a temporary storage device, and a central processing unit (CPU) executes instructions included in the read-out program. However, in an architecture capable of executing instructions by mapping a ROM and a RAM in one memory space, the CPU directly reads and executes instructions included in the program stored in the ROM.

Furthermore, a server program and a terminal program can be distributed and sold to the server computer, terminal computer or the like from a distribution server or the like that the business operator manages, via a transitory transmission medium such as a computer network, independently from the computer in which the these programs are executed.

Note that when the server that provides the video delivery service is constituted by a plurality of computers, the programs operating in the respective computers are a plurality of mutually different server programs that has mutually different functions and cooperate with each other. Thus, a combination of these programs can be considered to be a system program for implementing the delivery system.

Hereinafter, in the present embodiment, a description is given of, by way of example, a delivery system that provides a video delivery service that is utilized in so-called live commerce. The delivery system according to the present embodiment delivers live video relating to live commerce, and provides a text chat that enables an exchange of text among viewers. Here, live video means motion video that is delivered by a streamer and is delivered to a viewer in real time.

(Entire Configuration)

FIG. 1 is an explanatory view illustrating a cooperation of devices that implement a delivery system of the present embodiment. The delivery system 101 illustrated in the present figure includes a streamer terminal 102, and viewer terminals 103*a* to 103*f*. As indicated by thick arrows in the figure, these devices are communicably connected via a computer communication network such as the Internet. Note that in the present embodiment, in some cases, the viewer terminals 103*a* to 103*f* are referred to simply as viewer terminals 103.

The delivery system 101 further includes a delivery server 104. As indicated by thin arrows in the figure, the delivery server 104 is communicably connected to the streamer terminal 102 and viewer terminals 103*a* to 103*f* via a computer communication network such as the Internet, and relays communications of these devices.

The streamer terminal 102 is used by a streamer who delivers live video, and delivers via the delivery server 104 the motion video, which is, for example, photographed, created and edited by the streamer, to the viewer terminals 103*a* to 103*f*. In addition, the streamer terminal 102 displays text chats by the viewer terminals 103*a* to 103*f*, and accepts an action from the streamer.

The viewer terminal, 103*a* to 103*f*, is used by a viewer who views live video that is delivered, and plays back the delivered live video. In addition, the viewer terminal, 103*a* to 103*f*, accepts an input of text from the viewer, and displays a text chat among the viewer terminals 103.

Besides, the viewer terminals 103*a* to 103*f* are classified in any one of a plurality of groups, and a text chat is performed in the classified group. In the present embodiment, the viewer terminals 103*a* to 103*c* are classified in a group 1, and the viewer terminals 103*d* to 103*f* are classified in a group 2. The groups are classified by attributes of viewers who use the viewer terminals 103*a* to 103*f*. For example, viewer terminals 103, which are used by fans of a streamer of live video that is being delivered, are allocated to the group 1, and the viewer terminals 103 used by the other viewers are allocated to the group 2.

The delivery server 104 delivers the live video, which is delivered by the streamer terminal 102, to the viewer terminals 103*a* to 103*f*. In addition, the delivery server 104 executes a process of classifying each of the viewer terminals 103*a* to 103*f* into any one of the groups.

(Transmission/Reception of Data Among Terminals)

Figure 2:
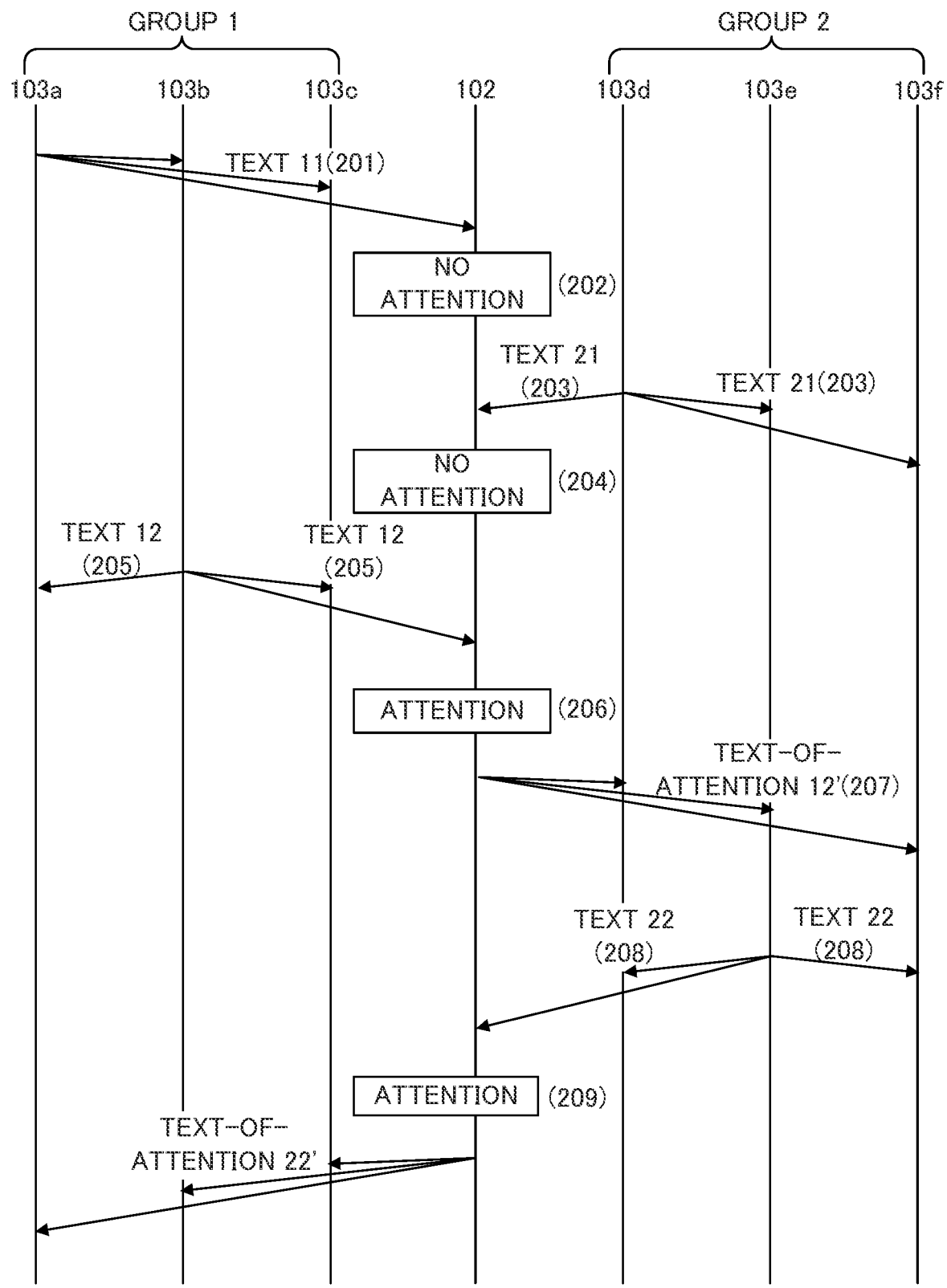
FIG. 2 is a session diagram illustrating a state of transactions between a streamer terminal and viewer terminals in Embodiment 1.

FIG. 2 is a session diagram illustrating a state of transactions of data in a case where, in the delivery system 101, viewers a to f, who are viewing live video X delivered by a streamer P, have text chats by using the viewer terminals 103*a* to 103*f*. Hereinafter, a description is given with reference to FIG. 2.

Figure 3:
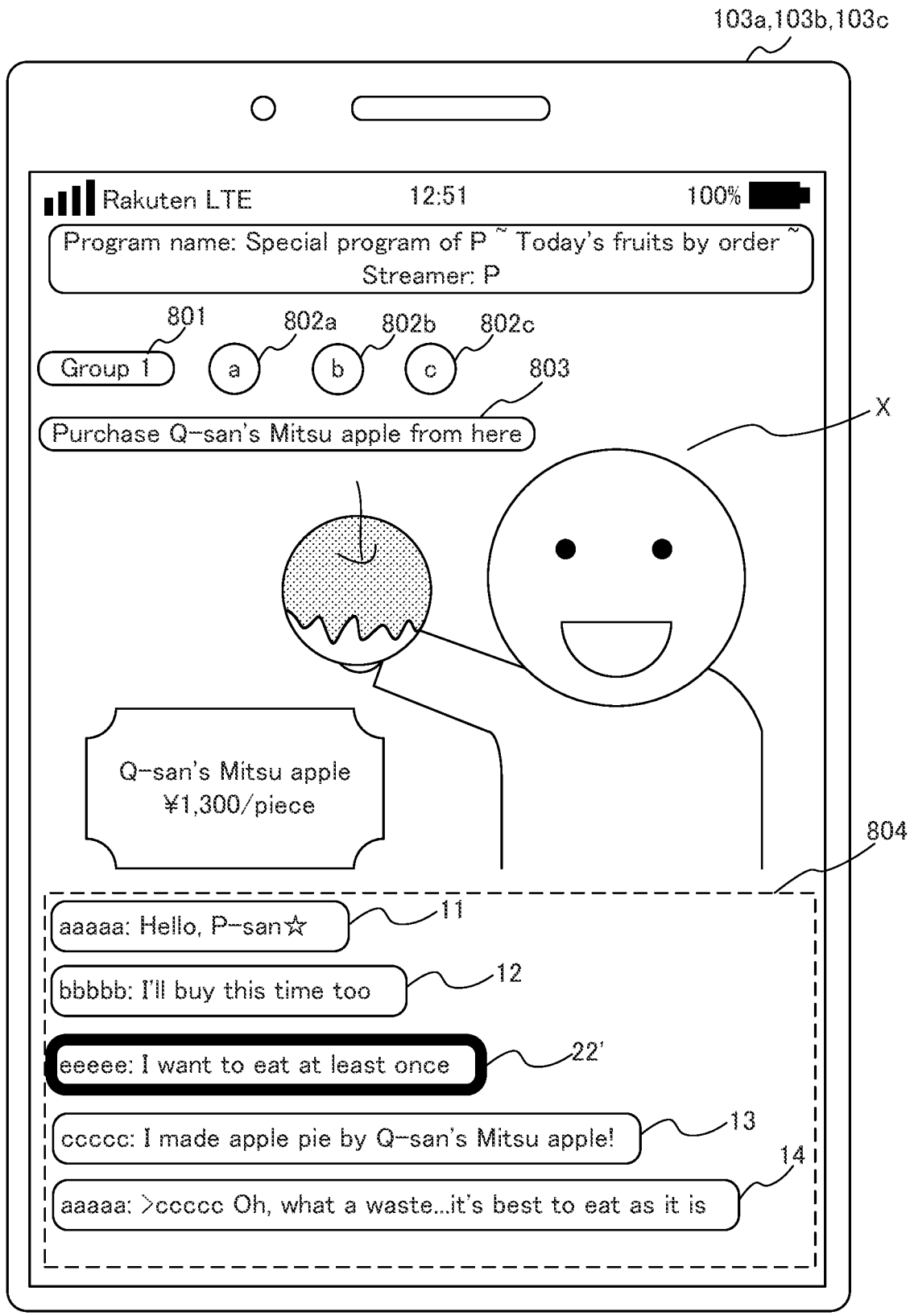
FIG. 3 is an explanatory view illustrating an example of a screen of a viewer terminal classified in a group 1.

If the viewer a inputs text 11 to the viewer terminal 103*a*, the viewer terminal 103*a* transmits the text 11 to the viewer terminals 103*b* and 103*c* belonging to the same group 1, and to the streamer terminal 102, while making the text 11 appear in the screen (201). Upon receiving the text 11, the viewer terminals 103*b* and 103*c* and streamer terminal 102 make the text 11 appear in the screens thereof. As illustrated in FIG. 3, the text 11 appears in the screen of the viewer terminal, 103*a* to 103*c*.

Referring back to FIG. 2, it is assumed here that the streamer pays no attention to the text 11 appearing in the screen (202). The text 11 is not transmitted to the viewer terminals 103*e* to 103*f* belonging to the other group 2.

Figure 4:
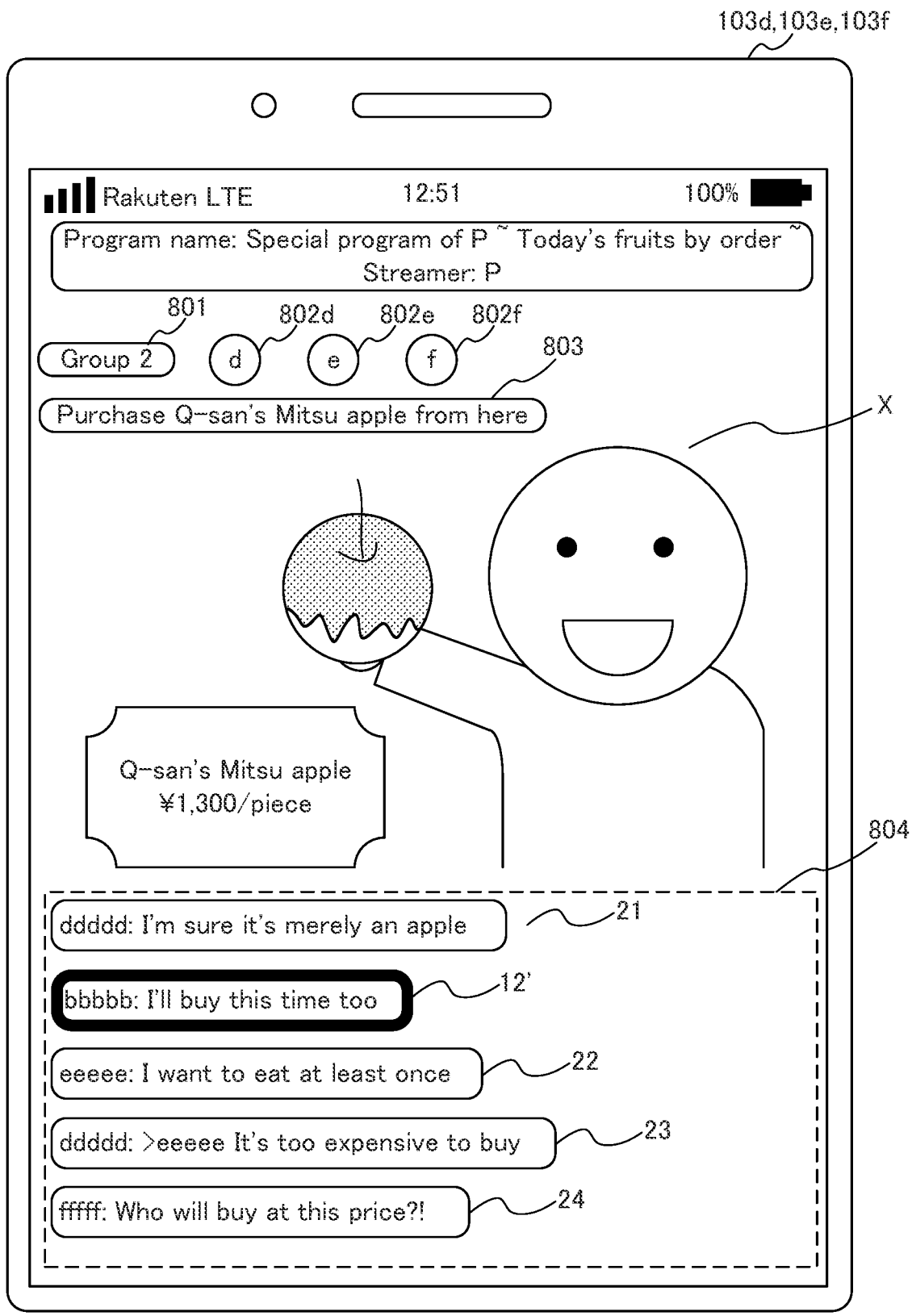
FIG. 4 is an explanatory view illustrating an example of a screen of a viewer terminal classified in a group 2.

Next, if the viewer d inputs text 21 to the viewer terminal 103*d*, the viewer terminal 103*d* transmits the text 21 to the viewer terminals 103*e* and 103*f* belonging to the same group 2, and to the streamer terminal 102, while making the text 21 appear in the screen (203). Upon receiving the text 21, the viewer terminals 103*e* and 103*f* and streamer terminal 102 make the text 21 appear in the screens thereof. As illustrated in FIG. 4, the text 21 appears in the screen of the viewer terminal, 103*d* to 103*f*.

Referring back to FIG. 2, it is assumed here that the streamer pays no attention to the text 21 appearing in the screen (204). The text 21 is not transmitted to the viewer terminals 103*a* to 103*c* belonging to the other group 1.

Subsequently, if the viewer b inputs text 12 to the viewer terminal 103*b*, the viewer terminal 103*b* transmits the text 12 to the viewer terminals 102*a* and 103*c* and the streamer terminal 102, while making the text 12 appear in the screen (205). Upon receiving the text 12, the viewer terminals 103*a* and 103*c* and streamer terminal 102 make the text 12 appear in the screens thereof. As illustrated in FIG. 3, the text 12 appears in the screen of the viewer terminal, 103*a* to 103*c*.

Figure 5:
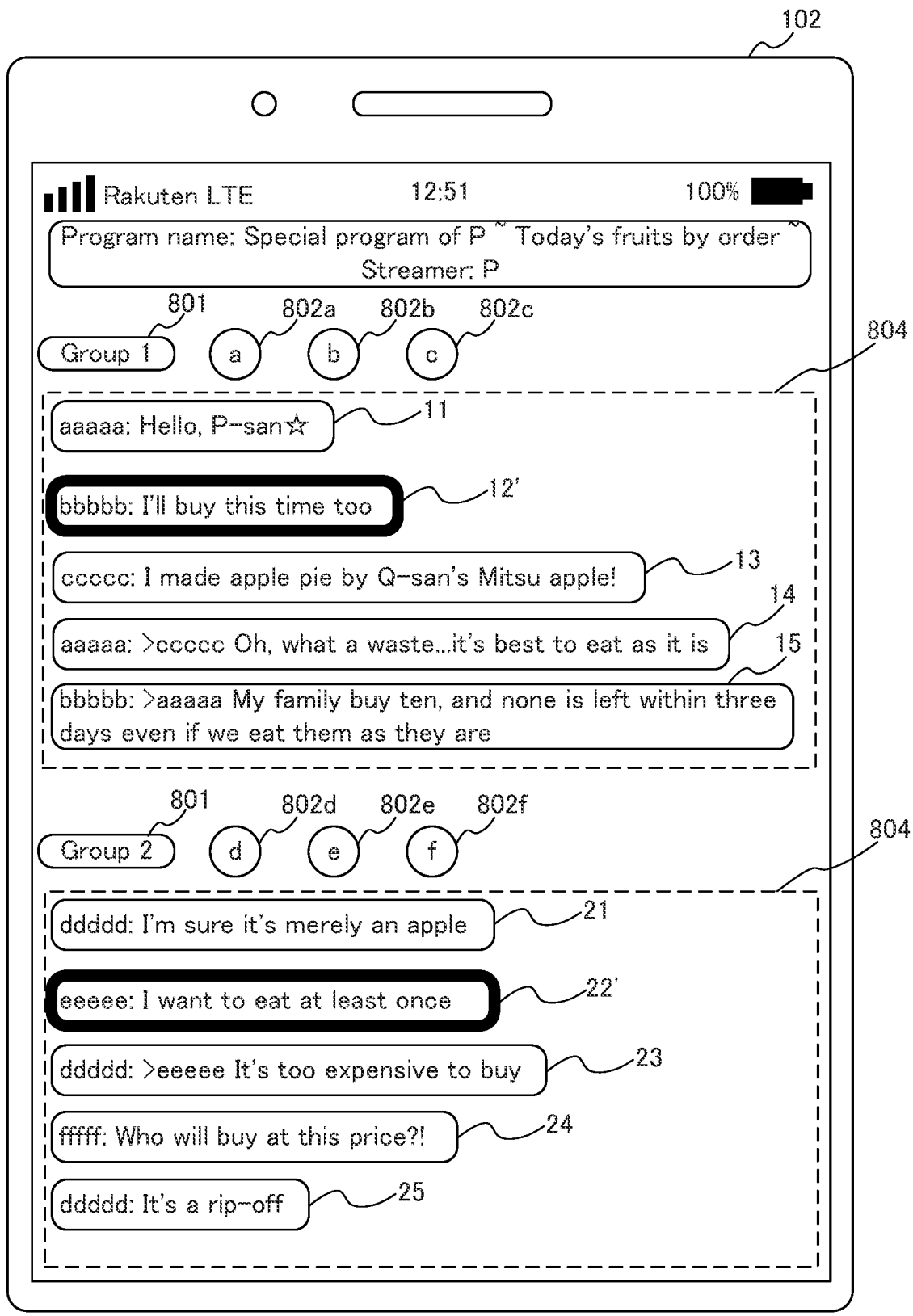
FIG. 5 is an explanatory view illustrating an example of a screen of the streamer terminal.

Referring back to FIG. 2, it is assumed here that the streamer pays attention to the text 12 appearing in the screen. Upon determining that the streamer pays attention to the text 12, the streamer terminal 102 executes an attention process on the text 12 (text-of-attention 12') (206). For example, as illustrated in FIG. 5, the streamer terminal 102 highlights the text-of-attention 12'.

Referring back to FIG. 2, the streamer terminal 102 transmits the text-of-attention 12' to the viewer terminals 103*d* to 103*f* belonging to the other group 2 (207). Upon receiving the text-of-attention 12', the viewer terminals 103*d* to 103*f* make the text-of-attention 12' appear in the screens thereof. As illustrated in FIG. 4, in the screens of the viewer terminals 103*d* to 103*f*, the text-of-attention 12' appears during the chat in the group 2.

Referring back to FIG. 2, subsequently, if the viewer e inputs text 22 to the viewer terminal 103*e*, the viewer terminal 103*e* transmits the text 22 to the viewer terminals 102*d* and 103*f* and the streamer terminal 102, while making the text 22 appear in the screen (208). Upon receiving the text 22, the viewer terminals 103*d* and 103*f* and streamer terminal 102 make the text 22 appear in the screens thereof. As illustrated in FIG. 4, the text 22 appears in the screens of the viewer terminals 103*d* to 103*f*.

Referring back to FIG. 2, it is assumed here that the streamer pays attention to the text 22 appearing in the screen. Upon determining that the streamer pays attention to the text 22, the streamer terminal 102 executes the attention process on the text 22 (text-of-attention 22') (209). For example, as illustrated in FIG. 5, the streamer terminal 102 highlights the text-of-attention 22'.

Referring back to FIG. 2, the streamer terminal 102 transmits the text-of-attention 22' to the viewer terminals 103a to 103c belonging to the other group 1 (210). Upon receiving the text-of-attention 22', the viewer terminals 103a to 103c make the text-of-attention 22' appear in the screens thereof. As illustrated in FIG. 3, in the screens of the viewer terminals 103a to 103c, the text-of-attention 22' appears during the chat in the group 1.

(Functional Configuration of Devices)

Figure 6:
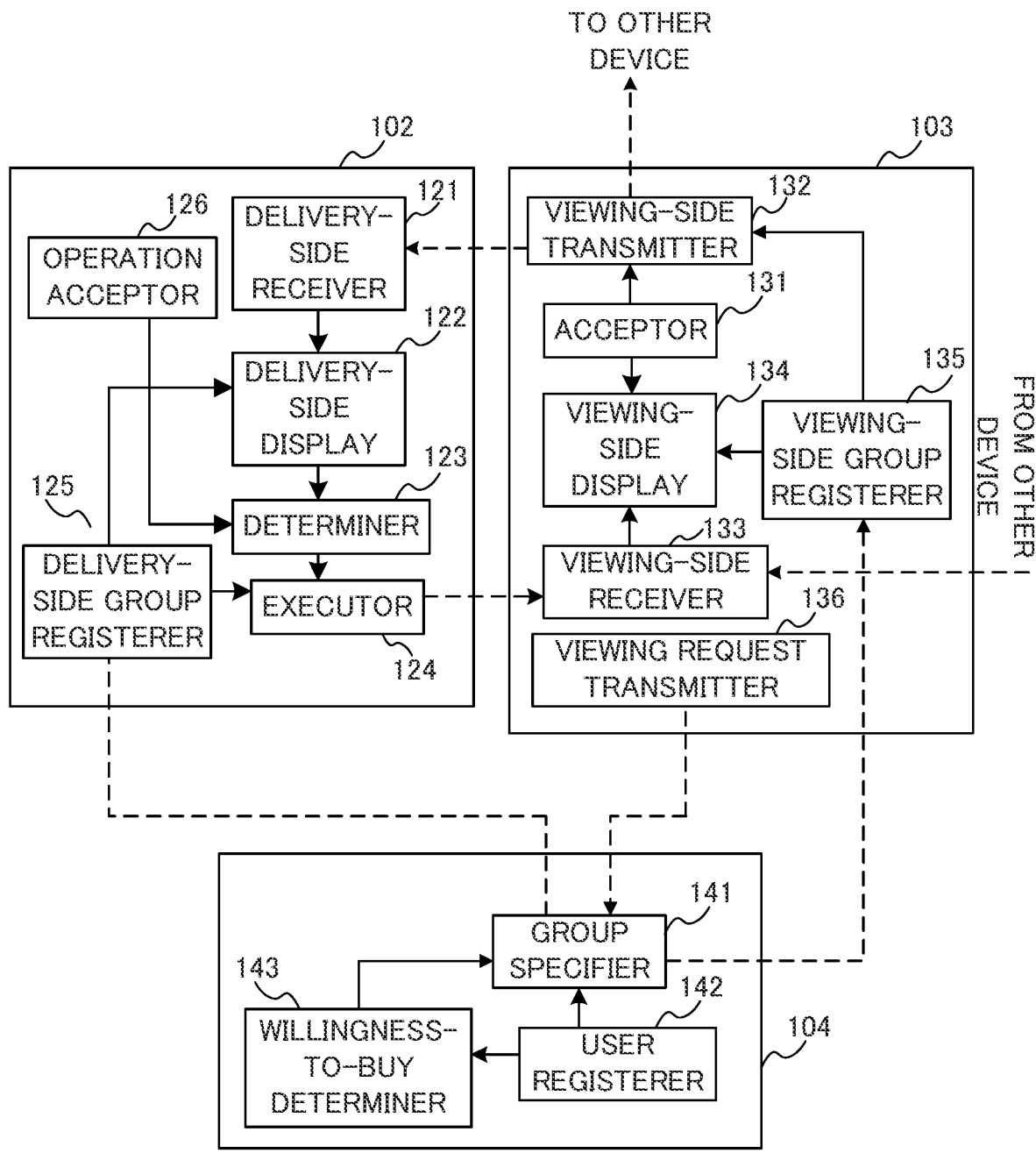
FIG. 6 is an explanatory view illustrating a functional configuration of devices in Embodiment 1.

Next, referring to FIG. 6, functional configurations of the streamer terminal 102, viewer terminal 103 and delivery server 104 in the present embodiment are described.

The streamer terminal 102 includes a delivery-side receiver 121, a delivery-side display 122, a determiner 123, an executor 124, a delivery-side group registerer 125 and an operation acceptor 126.

The delivery-side receiver 121 receives, from the viewer terminal 103, text that is posted from a viewer using the viewer terminal 103. As illustrated in FIG. 7, in the text received from the viewer terminal 103, an account name of the viewer using the viewer terminal 103 and a transmission time of the transmission of the text from the viewer terminal 103 are correlated.

Referring back to FIG. 6, when the delivery-side receiver 121 receives text, the delivery-side display 122 makes the received text appear in the screen of the streamer terminal 102.

Here, that the text appears means that the text is displayed in the screen. The text may appear in the order of reception of text by the delivery-side receiver 121, or may appear in the order of transmission time of the text. The text may have such a configuration that the text appears from the lower side of the screen, successively moves upward, and exits from the upper side of the screen, or may have such a configuration as to move in a reverse direction. Here, that the text exits means that the text is no longer displayed in the screen.

The determiner 123 determines whether the streamer P pays attention to the text, until the text exits from within the screen. When a plurality of texts appears and fills a chat display area 804 and thereafter new text appears, the text that first appeared among the appearing texts may first exit. Alternatively, after a predetermined time has passed since the appearance of text, the text may exit.

In addition, the determiner 123 determines whether the streamer P pays attention to the text, based on an operation by the streamer P, the operation being accepted by the operation acceptor 126 to be described later.

The executor 124 executes a predetermined attention process on the text-of-attention, to which the streamer P is determined to pay attention by the determiner 123. Examples of the method of determining whether the streamer P pays attention are described below.

(1) When the streamer P clicks text appearing in the screen by a mouse, or taps the text on a touch screen, the determiner 123 determines that the streamer P pays attention to the text.

(2) A speech by the streamer P is speech-recognized into text, and the resultant text is compared with the text currently appearing in the screen of the streamer terminal 102. If both are coincident or sufficiently similar (similarity may be determined by semantic analysis, or may be determined based on a degree of coincidence between word sequences that are left by eliminating ancillary words, such as a preposition and a postpositional particle, after a morphological analysis), the streamer P can be determined to have read aloud the text that is input by one of the viewers. Thus, in the case of this determination, it is regarded that "the streamer P paid attention to the text, and executed a read-aloud operation of reading aloud the text", and the determiner 123 determines that the streamer P pays attention to the text. In this mode, the streamer P does not need to execute an intentional or explicit operation on the determiner 123, and the streamer P is regarded as executing the "read-aloud operation" by simply performing such a natural act during live video streaming as mentioning the text to which the streamer P pays attention.

(3) While the live video X is being delivered, the streamer terminal 102 continuously photographs the face of the streamer P and traces the line of sight, and, when the streamer P is determined to have continuously viewed the text for a predetermined time, the determiner 123 determines that the streamer P pays attention to the text.

In addition, the executor 124 transmits the text-of-attention to the viewer terminals 103 that are classified in a group other than the group in which the viewer terminal 103, from which the text-of-attention was transmitted, is classified.

As illustrated in FIG. 8, the text-of-attention is correlated with a transmission time, an account name, a text number and an attention flag. The transmission time is a time at which the text-of-attention was transmitted from the streamer terminal 102, and is given when the streamer terminal 102 transmits the text-of-attention. The account name is an account name of the viewer using the viewer terminal 103 that transmitted the text. The text number is an identification number of the text. The attention flag is a flag identifying whether the text is text-of-attention, and "1", for example, is given in the case of the text-of-attention, and "0" is given in the case of not the text-of-attention.

Figure 9:
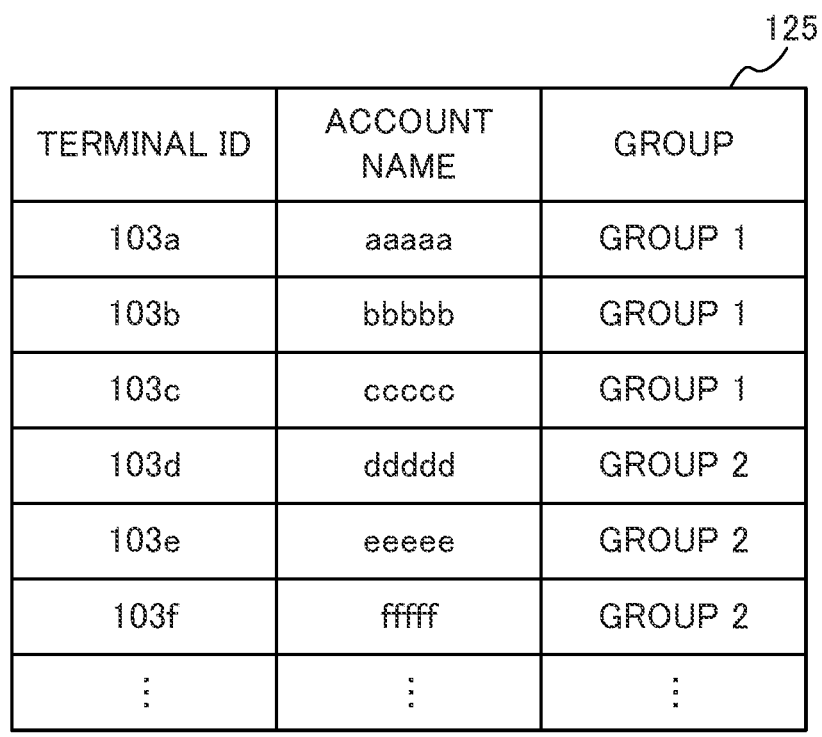
FIG. 9 is an explanatory view illustrating an example of information registered in a delivery-side group registerer.

Referring back to FIG. 6, the delivery-side group registerer 125 registers, with respect to each of the viewer terminals 103 that receive the stream of the live video X, a group into which the viewer terminal 103 is classified. As illustrated in FIG. 9, the delivery-side group registerer 125 correlates and registers a terminal ID, an account name and a group. The terminal ID is an identification number that identifies the viewer terminal that receives the stream of the live video X. This information registered in the delivery-side group registerer 125 is provided from the delivery server 104.

Referring back to FIG. 6, the operation acceptor 126 accepts an operation by the streamer P using the streamer terminal 102. The operation acceptor 126 may be a mouse or a touch panel, which accepts an operation from the streamer P, or may be a speech recognition device that converts text pronounced by the streamer P into characters. Besides, the operation acceptor 126 may be an eye tracking device that traces and measures the line of sight of the streamer P.

Next, the viewer terminal 103 includes an acceptor 131, a viewing-side transmitter 132, a viewing-side receiver 133, a viewing-side display 134, a viewing-side group registerer 135, and a viewing request transmitter 136.

The acceptor 131 accepts text that is posted from the viewer using the viewer terminal 103. The acceptor 131 may be a software keyboard that accepts a text input from the viewer, or may be a speech recognition device that converts text pronounced by the viewer into characters.

The viewing-side transmitter 132 transmits the text accepted by the acceptor 131 to the streamer terminal 102, and to the other viewer terminals 103 belonging to the group into which the streamer terminal 102 is classified.

The text that the viewer terminal 103 transmits, like the text illustrated in FIG. 7 and FIG. 8, is correlated with the transmission time, account name, text number and attention flag. Since the text is before being transmitted to the streamer terminal 102, "0" is given to the attention flag.

Referring back to FIG. 6, the viewing-side receiver 133 receives text that is transmitted from another viewer terminal belonging to the group into which the viewer terminal 103 is classified. In addition, the viewing-side receiver 133 receives text-of-attention from the streamer terminal 102.

The viewing-side display 134 makes the text received by the viewing-side receiver 133 appear in the screen. The viewing-side display 134 also makes the text accepted by the acceptor 131 appear in the screen. Furthermore, if the viewing-side receiver 133 receives text-of-attention, the viewing-side display 134 makes the received text-of-attention appear in the screen.

The viewing-side group registerer 135 correlates and registers the other viewer terminals 103 belonging to the group, into which this viewer terminal 103 is classified, the terminals ID and the account names. This information registered in the viewing-side group registerer 135 is provided from the delivery server 104.

The viewing request transmitter 136 transmits to the delivery server 104 a viewing request that designates the live video X that is delivered by the streamer terminal 102.

Next, the delivery server 104 includes a group specifier 141, a user registerer 142, and a willingness-to-buy determiner 143.

Upon receiving a viewing request from the viewer terminal 103, the group specifier 141 specifies a group to which the viewer terminal 103 is to belong, among a plurality of groups. The group specifier 141 may specify the group to which the viewer terminal 103 that is used by the viewer is to belong, based on a willingness-to-buy of the viewer, which is determined by the willingness-to-buy determiner 143 to be described later.

The user registerer 142 registers register information relating to the viewer using the viewer terminal 103. As illustrated in FIG. 10, the user registerer 142 correlates and registers a terminal ID, an account name, a purchase history, a viewing history, and a domicile.

The purchase history may be the number of times by which the viewer using this viewer terminal 103 purchased in the past the commodity or the like introduced in the live video X, or may be the number of times by which the viewer purchased in the past some commodity or the like in live commerce provided by the delivery system 101. The viewing history may be the number of times by which the viewer using this viewer terminal 103 viewed the motion video that the streamer P of the live video X delivered in the past, or may be the number of times by which the viewer viewed some motion video in the past in the live commerce provided by the delivery system 101. The domicile may be a domicile of the viewer using this viewer terminal 103, or may be a domicile inferred from an IP address of this viewer terminal 103. The terminal ID, account name and domicile are registered by the viewer registering in advance the terminal ID, account name and domicile at a time of starting the use of the live commerce provided by the delivery system 101.

Referring back to FIG. 6, the willingness-to-buy determiner 143 determines whether the willingness-to-buy of a commodity or a service, or goods or services by the viewer is high, based on the purchase history registered in the user registerer 142.

(Terminal Process and Server Process)

Figure 11:
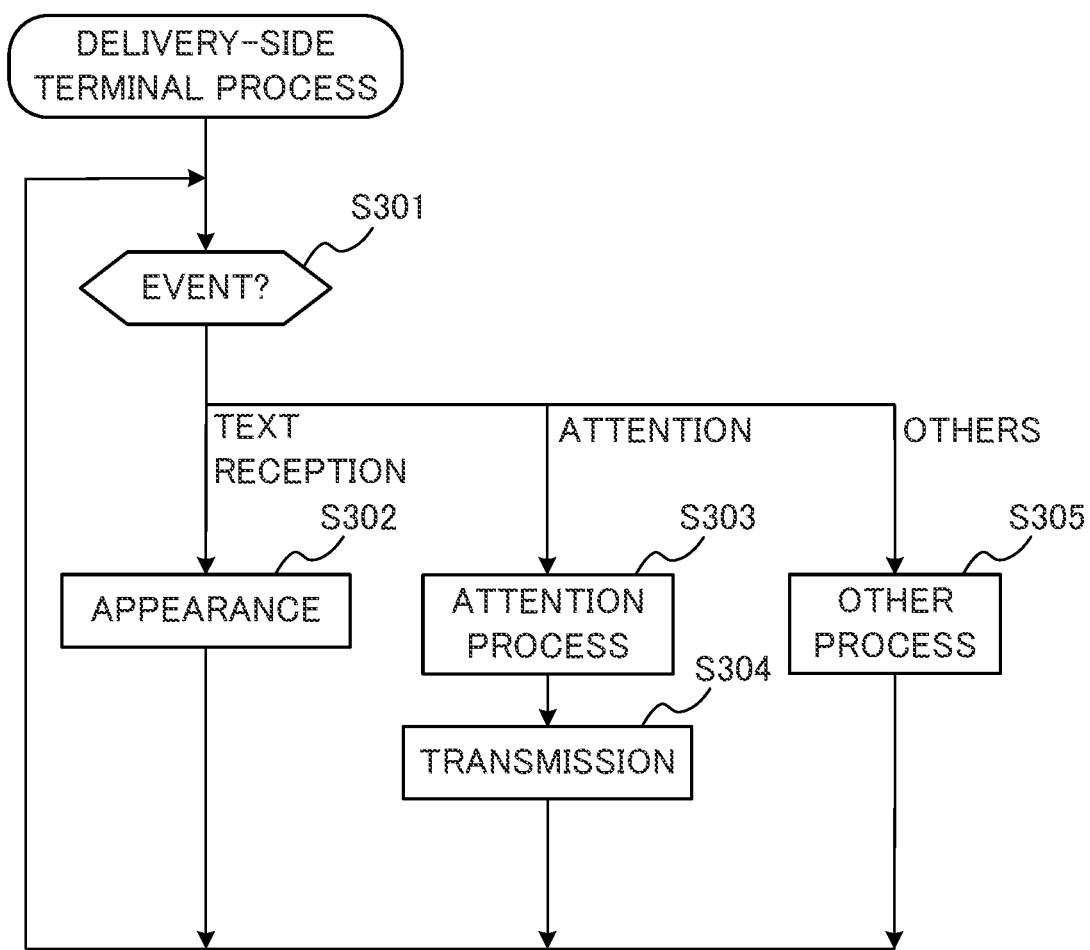
FIG. 11 is a flowchart illustrating a flow of a delivery-side terminal process in Embodiments 1 to 3.

FIG. 11 is a flowchart for describing a flow of a delivery-side terminal process that is executed by the streamer terminal 102. Hereinafter, a description is given with reference to FIG. 11.

The streamer terminal 102 starts the delivery-side terminal process at a time of starting the delivery of the live video X.

When the delivery-side terminal process is started, the streamer terminal 102 enters a standby state until some event occurs (step S301).

To begin with, when the delivery-side receiver 121 receives text from the viewer terminal 103, the delivery-side display 122 makes the received text appear in the screen (step S302). For example, as illustrated in FIG. 5, the delivery-side display 122 displays a text chat on a group-by-group basis. In the example illustrated in FIG. 5, a text chat in the group 1 is displayed in an upper-side chat display area 804, and a text chat in the group 2 is displayed in a lower-side chat display area 804. The delivery-side display 122 refers to the delivery-side group registerer 125 illustrated in FIG. 9, and makes the received text appear in the chat display area 804 of the group that is correlated with the account name of the transmission source of the text.

Referring back to FIG. 5, group name display portions 801 displaying group names, and viewer icons 802*a* to 802*f* of the viewers a to f, who use the viewer terminals 103 belonging to the groups, are displayed above the text chats of the respective groups.

Referring back to FIG. 11, when the text received by the delivery-side display 122 is made to appear in the screen, the process returns to step S301.

Next, when the determiner 123 determines that the streamer P pays attention to the text that appears, the executor 124 executes the attention process on the text-of-attention (step S303). For example, as illustrated in FIG. 5, the executor 124 makes text-of-attention 12' appear, by highlighting the text-of-attention 12'.

As regards whether the streamer P pays attention to the text that appears, for example, when the operation acceptor 126 that is the touch panel detects that the streamer P touches, such as by tapping, the part in the screen where the text is displayed, the streamer P may be determined to pay attention to the text.

Besides, when the operation acceptor 126 is a speech recognition device, a speech of the streamer P is speech-recognized into text, and the resultant text is compared with the text currently displayed in the screen by the delivery-side display 122. If both are coincident or similar, the streamer P may be determined to pay attention to the text and to read aloud the text.

In this case, the streamer P does not need to perform the read-aloud operation by intentionally reading aloud the text to the operation acceptor 126 that is the speech recognition device. The text becomes text-of-attention and is shared by all viewers by simply performing such a natural act during streaming that the text that is input by a viewer during a text chat is taken as a topic and is made known to other viewers, in order to perform transaction with viewers in the live video streaming.

Accordingly, in this mode, the streamer does not need to execute an explicit operation such as by clicking or tapping the text, and can smoothly deliver the live video.

Referring back to FIG. 11, subsequently, the executor 124 transmits the text-of-attention to the viewer terminals 103 classified in the other group (step S304). The executor 124 refers to the delivery-side group registerer 125 illustrated in FIG. 9, and specifies the group to which the viewer terminal 103 that is used by the viewer having the account name correlated with the text-of-attention belongs. Then, executor 124 transmits the text-of-attention to the viewer terminals 103 belonging to the group other than the group to which this viewer terminal 103 belongs. Referring back to FIG. 11, the process then returns to step S301.

When some other event occurs, the streamer terminal 102 executes a process corresponding to the event that occurs (step S305). For example, responding to an operation of the streamer P, the streamer terminal 102 starts the delivery of the live video X. The streamer terminal 102 transmits the live video X to the delivery server 104.

In addition, for example, if the information relating to the viewer terminal 103 that is currently playing back the live video X is provided from the delivery server 104, the delivery-side group registerer 125 registers the provided information, as illustrated in FIG. 9. Referring back to FIG. 11, the process then returns to step S301.

Figure 12:
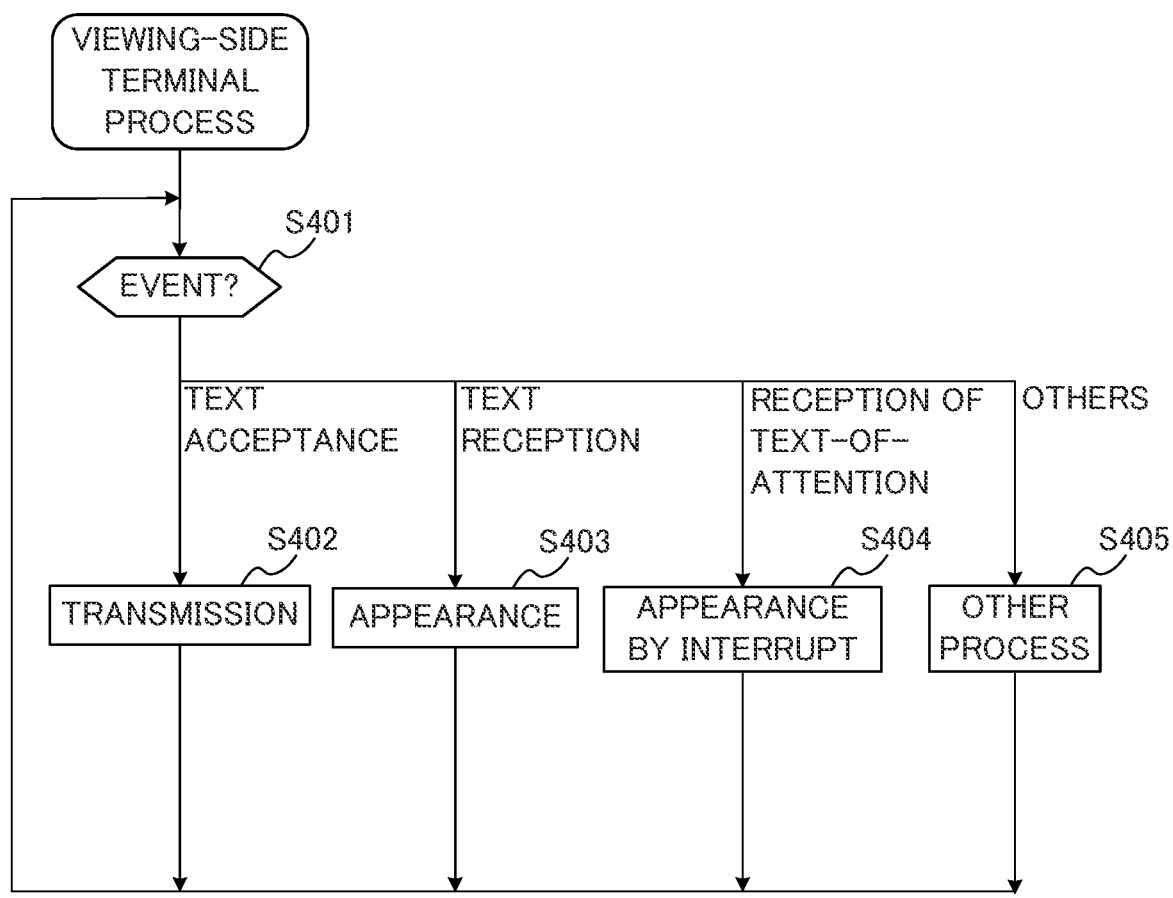
FIG. 12 is a flowchart illustrating a flow of a viewer-side terminal process in Embodiments 1 to 3.

FIG. 12 is a flowchart for describing a flow of a viewing-side terminal process that is executed by the viewer terminal 103. Hereinafter, a description is given with reference to FIG. 12.

The viewer terminal 103 starts the viewing-side terminal process at a time of starting the viewing of the live video X.

When the viewing-side terminal process is started, the viewer terminal 103 enters a standby state until some event occurs (step S401).

To begin with, when the acceptor 131 accepts text, the viewing-side transmitter 132 transmits the text to the streamer terminal 102 and the other viewer terminals 103 belonging to the same group, while the viewing-side display 134 displays the text (step S402). The viewing-side transmitter 132 refers to the viewing-side group registerer 135, and transmits the text to the viewer terminals 103 having the registered terminal IDs. Then, the process returns to step S401.

Next, when the viewing-side receiver 133 receives text from another viewer terminal 103, the viewing-side display 134 makes the received text appear (step S403). For example, like text 11 illustrated in FIG. 3, the viewing-side display 134 makes the text ("Hello, P-san☆), together with the account name ("aaaaa") of the viewer that transmitted the text, appear in the chat display area 804.

The viewing-side display 134 may arrange the chat display area 804 in such a manner as to overlap the live video X, under the live video X that is being played back. Besides, the viewing-side display 134 may display the group name display portion 801, viewer icon 802a and the like, and a link button 803. In the link button 803, a link to a purchase page of the commodity or the like introduced in the live video X may be embedded, or a purchase page of a link destination may be displayed by, for example, tapping the link button 803.

Referring back to FIG. 12, after the viewing-side display 134 makes the text appear, the process returns to step S401.

Next, if the viewing-side receiver 133 receives text-of-attention from the streamer terminal 102, the viewing-side display 134 makes the received text-of-attention appear (step S404). For example, as illustrated in FIG. 3, the viewing-side display 134 makes text-of-attention 22' from the group 2 appear, in an interrupt manner, on the chat display area 804 that displays the text chat of the group 1.

In addition, for example, like the text-of-attention 22' illustrated in FIG. 3, the viewing-side display 134 may make the text-of-attention appear in the chat display area 804, by highlighting the text-of-attention. Referring back to FIG. 12, the process then returns to step S401.

When some other event occurs, the viewer terminal 103 executes a process corresponding to the event that occurs (step S405).

For example, if the information relating to another viewer terminal 103 that is classified in the same group is provided from the delivery server 104, the viewing-side group registerer 135 registers the provided information.

For example, responding to an operation from the viewer, the viewing request transmitter 136 transmits to the delivery server 104 a viewing request that designates the live video X. For example, the viewing request transmitter 136 transmits the viewing request to the delivery server 104, when the acceptor 131 detects the tapping on a thumbnail image of the live video X that is displayed in the screen of the video delivery site.

In addition, for example, when the delivery of the live video X is started from the delivery server 104, the viewer terminal 103 plays back the data of the live video X while receiving the data of the live video X. Thereafter, the process returns to step S401.

Figure 13:
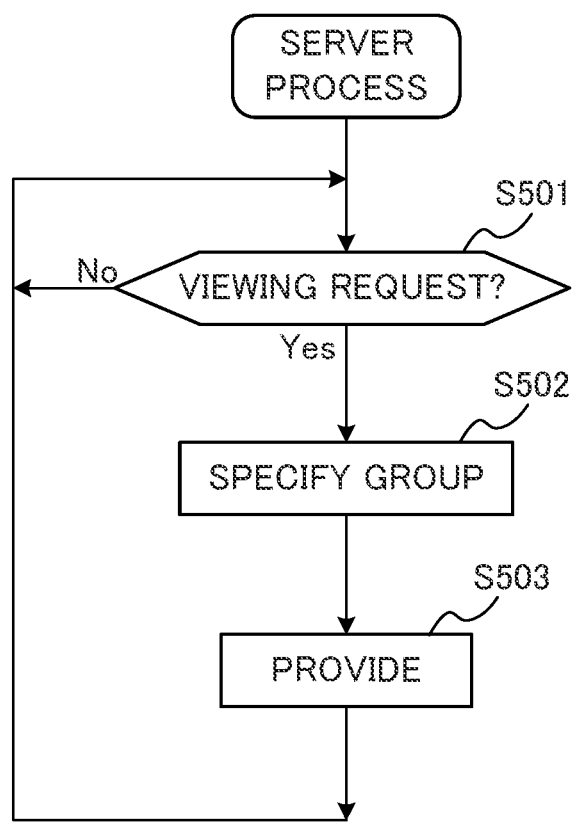
FIG. 13 is a flowchart illustrating a flow of a server process in Embodiment 1.

FIG. 13 is a flowchart for describing a flow of a server process that is executed in the delivery server 104 in the present embodiment. Hereinafter, a description is given with reference to FIG. 13.

If the delivery server 104 is powered ON, the delivery server 104 starts the server process.

If the server process is started, the delivery server 104 enters a standby state until receiving a viewing request for live video X from the viewer terminal 103 (No in step S501).

Upon receiving the viewing request for the live video X from the viewer terminal 103 (Yes in step S501), the delivery server 104 starts delivering to the viewer terminal 103 the live video X that is being delivered from the streamer terminal 102. Then, the group specifier 141 refers to the user registerer 142, and specifies the group to which the viewer terminal 103 that transmitted the viewing request is to belong (step S502).

For example, the group specifier 141 specifies the group to which the viewer terminal 103 that is used by the viewer is to belong, based on the purchase history included in the register information registered in the user registerer 142. The group specifier 141 refers to the purchase history registered in the user registerer 142 illustrated in FIG. 10, and specifies, as the group 1, the group to which the viewer terminal 103 used by the viewer with the purchase history of five times or more is to belong, and specifies the other group as the group 2.

The group specifier 141 may specify the group to which the viewer terminal 103 that is used by the viewer is to belong, based on a willingness-to-buy of the viewer, which is determined by the willingness-to-buy determiner 143. The willingness-to-buy determiner 143 determines, for example, that the willingness-to-buy is high for a viewer with the purchase history of five times or more, and that the willingness-to-buy is low for other viewers. Then, the group specifier 141 specifies, as the group 1, the group to which the viewer terminal 103 used by the viewer determined to have a high willingness-to-buy is to belong, and specifies the other group as the group 2. Besides, the viewer terminals 103 may be classified into many (three or more) groups such that the degrees of the willingness-to-buy of viewers become substantially equal.

If viewers with greatly different degrees of the willingness-to-buy are classified in the same group, a viewer with a low willingness-to-buy cannot follow topics or purchase activities of viewers with a high willingness-to-buy, and may feel alienated and stop the viewing itself. In the present mode, viewers with a substantially equal willingness-to-buy are classified in the same group, and thereby viewers with a high willingness-to-buy can exchange comments among these viewers in the group, and viewers with a low willingness-to-buy can exchange comments among these viewers in the group. It is considered highly probable that the viewers with the high willingness-to-buy make positive comments promoting purchase activities, or encourage each other to purchase, in the text chat in regard to commodities or the like introduced in the live video X. With the ratio of positive comments increasing in the group, a user with a high willingness-to-buy can further be guided to purchase. On the other hand, the viewers with the low willingness-to-buy will continue the viewing with an interest in the content itself of the live stream of the streamer P, and can be prevented from leaving the viewing.

In addition, for example, the group specifier 141 specifies the group to which the viewer terminal 103 that is used by the viewer is to belong, based on the viewing history included in the register information registered in the user registerer 142. The group specifier 141 refers to the viewing history registered in the user register 142 illustrated in FIG. 10, and specifies, as the group 1, for example, the group to which the viewer terminal 103 used by the viewer with the viewing history of ten times or more is to belong, and specifies the other group as the group 2.

Furthermore, for example, the group specifier 141 specifies the group to which the viewer terminal 103 that is used by the viewer is to belong, based on the domicile of the viewer included in the register information registered in the user registerer 142. The group specifier 141 refers to the domicile of the viewer registered in the user register 142 illustrated in FIG. 10, and specifies the group to which the viewer terminal 103 used by the viewer is to belong, for example, by the prefecture that the viewer lives in. By classifying the group, based on the viewer's domicile, for example, when a relay server relaying communication is arranged on an area-by-area basis, the communication load can be reduced.

Referring back to FIG. 13, the group specifier 141 subsequently provides, to the streamer terminal 102 and viewer terminal 103, the information in which the terminal IDs relating to the specified group, the account names and the group name are correlated (step S504). The group specifier 141 provides, to the streamer terminal 102, the information relating to the specified groups in regard to all viewer terminals 103 that transmitted viewing requests. On the other hand, the group specifier 141 provides, to the viewer terminal 103, the information relating to the viewer terminals 103 classified in the same group as this viewer terminal 103. Then, the process returns to step S501.

As described above, according to Embodiment 1, based on the register information relating to the viewer, the viewer terminal 103 used by the viewer is classified in any one of the groups. Thereby, since the viewers having similar backgrounds can make comments in the same text chat, the communication among the viewers can be enlivened, and the number of viewers, who feel alienated and leave the motion video, can be reduced. In addition, since a star-type communication network, which centers on the streamer terminal 102, is set and a mesh-type communication network is set for the viewer terminals 103 only in a small group, the communication load as a whole can be held down.

Furthermore, according to Embodiment 1, the text-of-attention, to which the streamer pays attention, is made to appear in the text chat of some other group. Thereby, the viewers can understand the intention of the streamer, and can make the communication in the group livelier by referring to the comments of the other group.

Embodiment 2

Next, Embodiment 2 of the present disclosure is described. In Embodiment 1, the respective terminals, namely the streamer terminal 102 and the viewer terminal 103, transmit and receive the text without via the delivery server 104. In Embodiment 2, however, the terminals transmit and receive the text via the delivery server 104. Hereinafter, the same structural components as in Embodiment 1 are denoted by identical reference signs.
(Functional Configuration of Devices)

Figure 14:
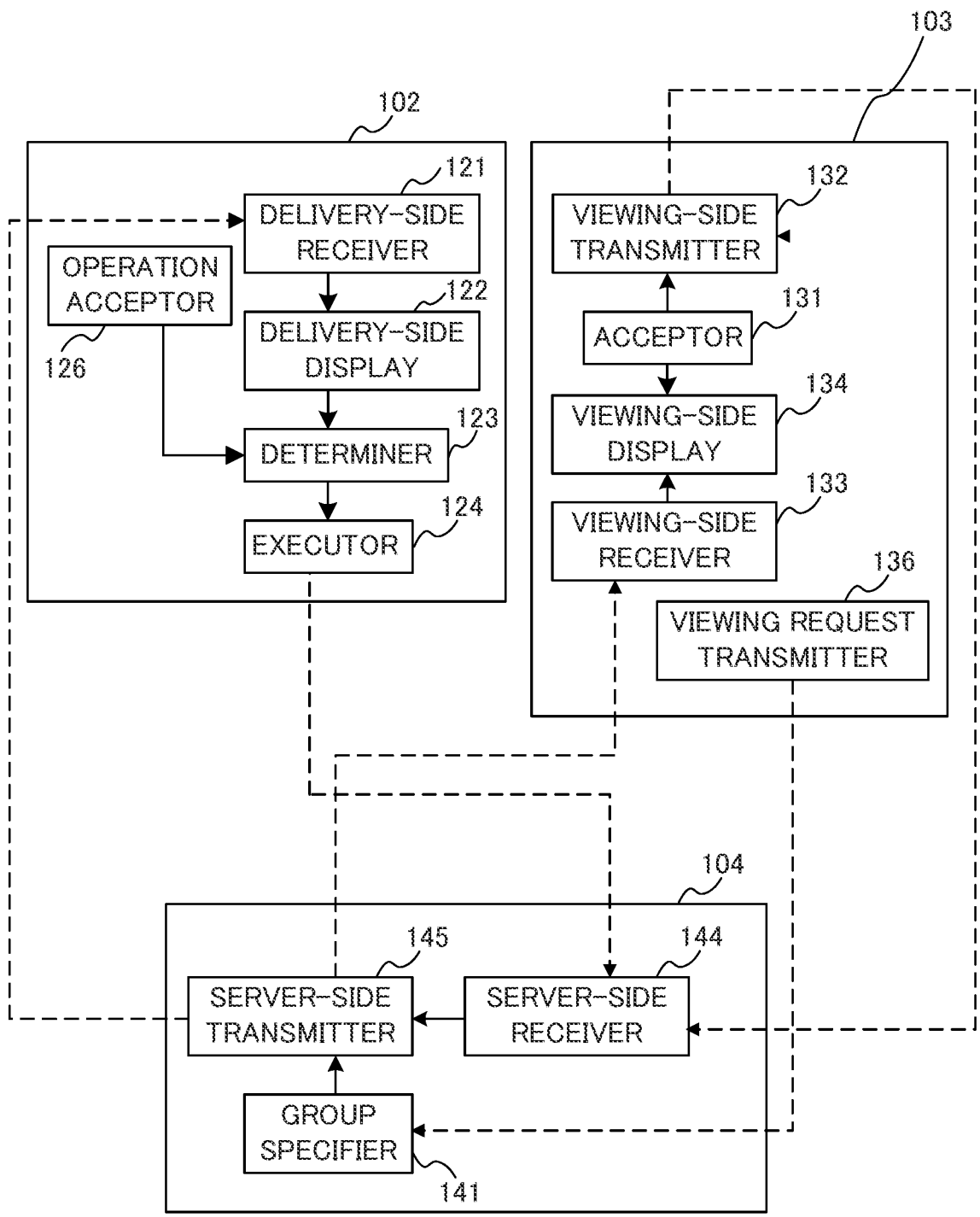
FIG. 14 is an explanatory view illustrating a functional configuration of devices in Embodiments 2 and 3.

FIG. 14 is a view illustrating a functional configuration of a streamer terminal 102, a viewer terminal 103 and a delivery server 104 in the present embodiment.

The delivery-side receiver 121 of the streamer terminal 102 receives text from the delivery server 104. The text is text posted from a viewer, and the text is once transmitted to the delivery server 104 and then transmitted from the delivery server 104 to the streamer terminal 102.

In the attention process, the executor 124 transmits text-of-attention to the delivery server 104. The text-of-attention is once transmitted to the delivery server 104 and then transmitted from the delivery server 104 to the viewer terminals 103 belonging to a group other than the group into which the viewer terminal 103, from which the text-of-attention is transmitted, is classified.

The viewing-side transmitter 132 of the viewer terminal 103 transmits text, which is accepted by the acceptor 131, to the delivery server 104.

The viewing-side receiver 133 receives the text-of-attention from the delivery server 104.

The viewing-side display 134 makes the text-of-attention received by the viewing-side receiver 133 appear in the screen.

The delivery server 104 includes a server-side receiver 144 and a server-side transmitter 145, in addition to the group specifier 141, the user registerer 142 and the willingness-to-buy determiner 143 in Embodiment 1. Note that the illustration of the user registerer 142 and the willingness-to-buy determiner 143 is omitted in the present Figure.

The group specifier 141 includes the information relating to the group into which each viewer terminal 103 registered in the delivery-side group registerer 125 illustrated in FIG. 9 is classified in Embodiment 1. The group specifier 141 refers to the user registerer 142, and specifies and registers the group to which each viewer terminal 103 is to belong.

The server-side receiver 144 receives the text, which is posted from the viewer using the viewer terminal 103, from the viewer terminal 103.

If the server-side receiver 144 receives the text from the viewer terminal 103, the server-side transmitter 145 transmits the text to the streamer terminal 102 and to the other viewer terminals 103 belonging to the group into which the viewer terminal 103, from which the text is transmitted, is classified. In addition, if the server-side receiver 144 receives text-of-attention, the server-side transmitter 145 transmits the text-of-attention to the viewer terminals that are classified in a group other than the group in which the viewer terminal, from which the text-of-attention is transmitted, is classified.

(Terminal Process and Server Process)

Next, the delivery-side terminal process, viewing-side terminal process and server process in the present embodiment are described with respect to different parts from Embodiment 1. The same processes as in Embodiment 1 are denoted by identical reference signs.

In the delivery-side terminal process illustrated in FIG. 11, if the executor 124 of the streamer terminal 102 executes the attention process on the text-of-attention (step S303), the executor 124 transmits the text-of-attention to the delivery server 104 (step S304). After the transmission, the process returns to step S301.

In the viewing-side terminal process illustrated in FIG. 12, if the acceptor 131 accepts text, the viewing-side transmitter 132 transmits the text to the delivery server 104, while the viewing-side display 134 displays the text (step S402). After the transmission, the process returns to step S401.

Figure 15:
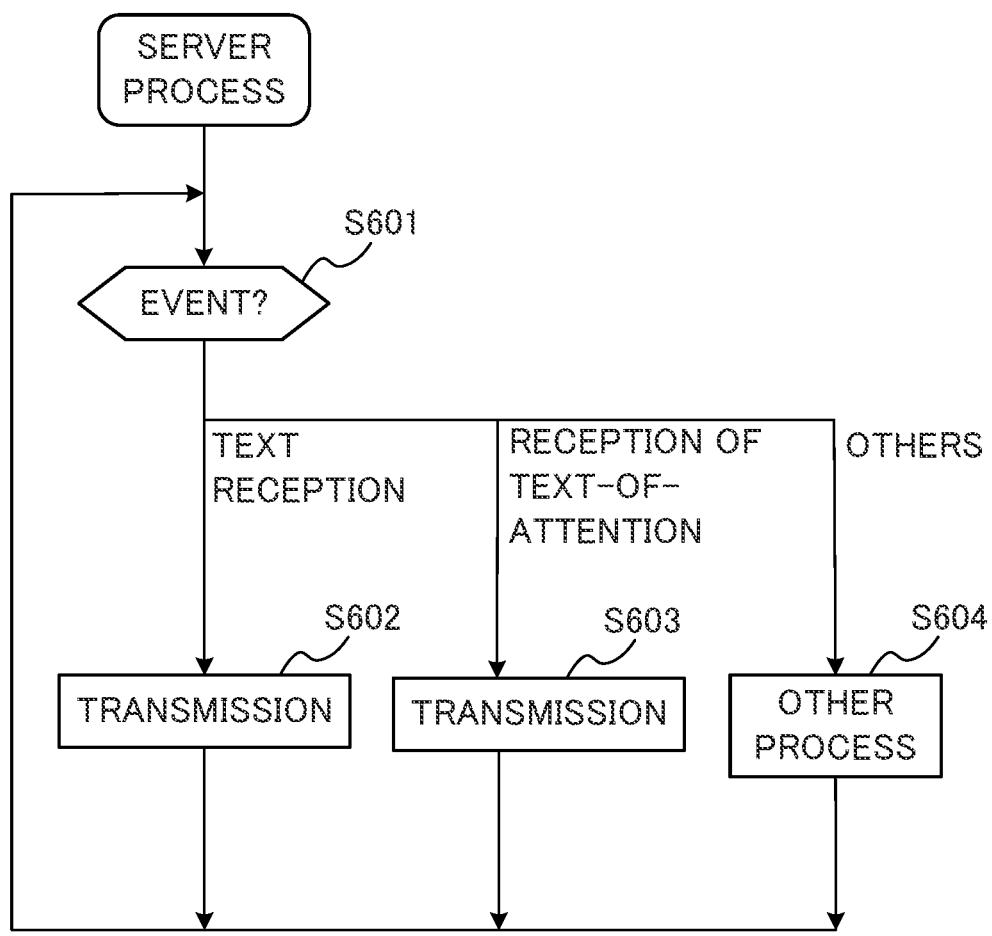
FIG. 15 is a flowchart illustrating a flow of a server process in Embodiments 2 and 3.

FIG. 15 is a flowchart for describing a flow of a server process executed in the delivery server 104 in the present embodiment. Hereinafter, a description is given with reference to FIG. 15.

If the delivery server 104 is powered ON, the delivery server 104 starts the server process.

If the server process is started, the delivery server 104 enters a standby state until some event occurs (step S601).

If the server-side receiver 144 receives text from the viewer terminal 103, the server-side transmitter 145 transmits the received text to the streamer terminal 102 and to the other viewer terminals 103 belonging to the group into which the viewer terminal 103, from which the text is transmitted, is classified (step S602). The server-side transmitter 144 refers to the information relating to the groups into which the viewer terminals 103 registered in the group specifier 141 are classified, specifies the other viewer terminals 103 belonging to the group into which the viewer terminal 103, from which the text is transmitted, is classified, and transmits the text thereto. Thereafter, the process returns to step S601.

If the server-side receiver 144 receives text-of-attention from the streamer terminal 102, the server-side transmitter 145 transmits the text-of-attention to the viewer terminals 103 belonging to a group other than the group into which the viewer terminal 103, from which the text-of-attention is transmitted, is classified (step S603). The server-side transmitter 144 refers to the information relating to the groups into which the viewer terminals 103 registered in the group specifier 141 are classified, specifies the viewer terminals 103 belonging to the group other than the group into which the viewer terminal 103, from which the text-of-attention is transmitted, is classified, and transmits the text-of-attention thereto. Thereafter, the process returns to step S601.

When some other event occurs, the delivery server 104 executes a process corresponding to the event that occurs (step S604). Thereafter, the process returns to step S601.

As described above, according to Embodiment 2, the respective terminals, namely the streamer terminal 102 and the viewer terminal 103, transmit and receive the text via the delivery server 104. Thereby, since the streamer terminal 102 and the viewer terminal 103 do not need to store addresses of terminals of transmission destinations, which are necessary when transmitting text, the load on the CPU and the necessary capacity of the storage device can be reduced.

Embodiment 3

Next, Embodiment 3 of the present disclosure is described. In Embodiment 2, the delivery server 104 transmits the text-of-attention to the viewer terminals 103 that are classified in the group other than the group in which the viewer terminal 103 that transmitted the text-of-attention is classified. In Embodiment 3, the delivery server 104 transmits the text-of-attention to all viewer terminals 103 with which the live video X is being viewed, and, if the received text-of-attention has not appeared on the viewer terminal 103 before this time, the text-of-attention is made to appear in the screen. Hereinafter, the same structural components as in Embodiment 2 are denoted by identical reference signs.

(Terminal Process and Server Process)

The delivery-side terminal process in the present embodiment is the same as the delivery-side terminal process in Embodiment 2. Here, the viewing-side terminal process and server process in the present embodiment are described with respect to different parts from Embodiment 2. The same processes as in Embodiment 2 are denoted by identical reference signs.

In the viewing-side terminal process illustrated in FIG. 12, when the viewing-side receiver 133 receives the text-of-attention from the delivery server 104, the viewing-side display 134 makes the text-of-attention appear in the screen if the text-of-attention has not appeared in the screen before the time point of the reception of the text-of-attention (step S404). If the received text-of-attention has already appeared in the screen, the viewing-side display 134 does not make the text-of-attention appear in the screen. Thereby, even if the text-of-attention is received from the delivery server 104, if the text-of-attention is transmitted from within the group to which the viewer terminal 103 belongs, this text does not appear overlappingly. Thereafter, the process returns to step S401.

In the server process illustrated in FIG. 15, if the server-side receiver 144 receives the text-of-attention from the streamer terminal 102, the server-side transmitter 145 transmits the text-of-attention to all viewer terminals 103 that are classified in any of the groups (step S603). Thereafter, the process returns to step S601.

As described above, according to Embodiment 3, the delivery server 104 transmits the text-of-attention to all viewer terminals 103 with which the live video X is being viewed, and, when the received text-of-attention has not appeared in the screen before this time point, the viewer terminal 103 makes the text-of-attention appear in the screen. Thereby, since the delivery server 104 does not need to select terminals of transmission destinations of the text-of-attention, the server load of the delivery server 104 can be reduced.

Modifications

In Embodiments 1 to 3 described above, the viewer terminals 103a to 103f are described as being classified in any one of groups by attributes of viewers using the viewer terminals 103a to 103f, but the viewer terminals 103a to 103f may be classified at random. By classifying the viewer terminals 103 into some small groups, the amount of text appearing in the text chat in the group can be reduced, and a text chat with a so-called usability that is high can be achieved.

In addition, in Embodiments 1 to 3 described above, the viewing-side display 134 is described as making the text, which is accepted by the acceptor 131, appear in the screen. The viewing-side transmitter 132 may transmit the text accepted by the acceptor 131 to the streamer terminal 102 or delivery server 104, and the viewing-side display 134 may make the text, which is received by the viewing-side receiver 133 from the streamer terminal 102 or delivery server 104, appear in the screen.

Supplementary Notes

Embodiments according to the present disclosure are supplementarily described below.

[1]

A delivery system including a plurality of viewer terminals to which live video is delivered, the plurality of viewer terminals comprising one or more processors, and a streamer terminal comprising one or more processors and used by a streamer that delivers the live video, wherein at least one of the one or more processors included in the streamer terminal executes:

a delivery-side reception process of receiving, from the viewer terminal, text posted from a viewer using the viewer terminal;

a delivery-side display process of making, when the text is received, the text appear in a screen;

a determination process of determining whether the streamer pays attention to the text, until the text exits from within the screen; and an execution process of executing a predetermined attention process on text-of-attention that the streamer is determined to pay attention to, the viewer terminals are classified into any one of a plurality of groups, at least one of the one or more processors included in each terminal of the viewer terminals executes:

an acceptance process of accepting text posted from a viewer using the each terminal;

a viewing-side transmission process of transmitting the accepted text to the streamer terminal and another viewing terminals belonging to a group into which the each terminal is classified;

a viewing-side reception process of receiving text transmitted from another viewer terminal belonging to the group into which the each terminal is classified; and a viewing-side display process of making the received text appear in a screen, in the attention process of the streamer terminal, the text-of-attention is transmitted to viewer terminals that are classified in a group other than the group into which the viewer terminal, from which the text-of-attention is transmitted, is classified, and when the text-of-attention is received in each terminal of the viewer terminals, the received text-of-attention is made to appear in the screen.

[2]

The delivery system according to [1], further including a delivery server comprising one or more processors and cooperating with the streamer terminal, wherein at least one of the one or more processors included in the delivery server executes:

a server-side reception process of receiving, from the viewer terminal, text posted from the viewer using the viewer terminal; and a server-side transmission process of transmitting, when the text is received, the text to the streamer terminal and another viewer terminals belonging to a group into which the viewer terminal, from which the text is transmitted, is classified, in the attention process of the streamer terminal, the text-of-attention is further transmitted to the delivery server, in the server-side reception process of the delivery server, the text-of-attention is further received, in the server-side transmission process, the text-of-attention is further transmitted to viewer terminals that are classified in a group other than the group into which the viewer terminal, from which the text-of-attention is transmitted, is classified, in the viewing-side reception process of each terminal of the viewer terminals, the text-of-attention transmitted from the delivery server is further received, and in the viewing-side display process, the received text-of-attention is further made to appear in the screen.

[3]

The delivery system according to [1], further including a delivery server comprising one or more processors and cooperating with the streamer terminal, wherein by at least one of the one or more processors included in the delivery server, the delivery server executes:

a server-side reception process of receiving, from the viewer terminal, text posted from the viewer using the viewer terminal; and a server-side transmission process of transmitting, when the text is received, the text to the streamer terminal and another viewer terminals belonging to a group into which the viewer terminal, from which the text is transmitted, is classified, in the attention process of the streamer terminal, the text-of-attention is further transmitted to the delivery server, in the server-side reception process of the delivery server, the text-of-attention is further received, in the server-side transmission process, the text-of-attention is further transmitted to all viewer terminals that are classified in any one of the groups, in the viewing-side reception process of each terminal of the viewer terminals, the text-of-attention transmitted from the delivery server is further received, and in the viewing-side display process, the text-of-attention is further made to appear in the screen, when the text-of-attention does not appear in the screen before a time point when the text-of-attention is received.

[4]

The delivery system according to any one of [1] to [3], further including a delivery server comprising one or more processors and cooperating with the streamer terminal, wherein at least one of the one or more processors included in each terminal of the viewer terminals further executes a viewing request transmission process of transmitting, to the delivery server, a viewing request that designates the live video that is delivered by the streamer terminal, and at least one of the one or more processors included in the delivery server further executes a group specifying process of specifying, upon receiving the viewing request from the viewer terminal, a group to which the viewer terminal is to belong, among a plurality of groups.

[5]

The delivery system according to [4], wherein at least one of the one or more processors included in the delivery server further executes a user registration process of registering register information relating to the viewer using the viewer terminal, and in the group specifying process, the group to which the viewer terminal used by the viewer is to belong is specified based on the register information registered in the user registration process.

[6]

The delivery system according to [5], wherein the register information registered in the user registration process includes a purchase history of goods or services purchased by the viewer in a past, and in the group specifying process, the group to which the viewer terminal used by the viewer is to belong is specified based on the purchase history included in the register information.

[7]

The delivery system according to [6], wherein at least one of the one or more processors included in the delivery server further executes a willingness-to-buy determination process of determining whether a willingness-to-buy of goods or services by the viewer is high, based on the purchase history, and in the group specifying process, the group to which the viewer terminal used by the viewer is to belong is specified based on the willingness-to-buy of the viewer determined in the willingness-to-buy determination process.

[8]

The delivery system according to any of [5] to [7], wherein the register information registered in the user registration process includes a viewing history of motion video by the viewer, and in the group specifying process, the group to which the viewer terminal used by the viewer is to belong is specified based on the viewing history included in the register information.

[9]

The delivery system according to any one of [5] to [8], wherein the register information registered in the user registration process includes a domicile of the viewer, and in the group specifying process, the group to which the viewer terminal used by the viewer is to belong is specified based on the domicile of the viewer included in the register information.

[10]

The delivery system according to any one of [1] to [9], wherein at least one of the one or more processors included in the streamer terminal further executes an operation acceptance process of accepting an operation by the streamer using the streamer terminal, and in the determination process, whether the streamer pays attention to the text is determined based on the operation by the streamer accepted in the operation acceptance process.

[11]

The delivery system according to [10], wherein in the operation acceptance process, a pressing operation on the text that is made to appear in the delivery-side display process is accepted, and in the determination process, that the streamer pays attention to the text is determined when the pressing operation on the text is accepted in the operation acceptance process.

[12]

The delivery system according to [10] or [11], wherein in the operation acceptance process, a result of speech recognition of a speech of the streamer is compared with each text appearing in the screen by the delivery-side display process, and when the result and the each text are coincident or similar, that the streamer pays attention to the coincident or similar text is determined.

[13]

A delivery method in a delivery system including a plurality of viewer terminals to which live video is delivered, and a streamer terminal used by a streamer that delivers the live video, the delivery method including:

by the streamer terminal, receiving, from the viewer terminal, text posted from a viewer using the viewer terminal;

making when the text is received, the text appear in a screen;

determining whether the streamer pays attention to the text, until the text exits from within the screen; and executing a predetermined attention process on text-of-attention that the streamer is determined to pay attention to, by each terminal of the viewer terminals classified into any one of a plurality of groups, accepting text posted from a viewer using the each terminal;

transmitting the accepted text to the streamer terminal and another viewing terminals belonging to a group into which the each terminal is classified;

receiving text transmitted from another viewer terminal belonging to the group into which the each terminal is classified; and making the received text appear in a screen, by the streamer terminal, transmitting, in the attention process, the text-of-attention to viewer terminals that are classified in a group other than the group into which the viewer terminal, from which the text-of-attention is transmitted, is classified, and by each terminal of the viewer terminals, making when the text-of-attention is received, the received text-of-attention appear in the screen.

[14]

A delivery server communicably connected to a plurality of viewer terminals classified in any one of a plurality of groups, and to a streamer terminal used by a streamer that delivers live video, the live video being delivered to the viewer terminals, the delivery server including one or more processors, wherein at least one of the one or more processors executes:

a process of receiving, from the viewer terminal, text posted from a viewer using the viewer terminal;

a process of transmitting, when the text is received, the text to the streamer terminal and another viewer terminals belonging to a group into which the viewer terminal, from which the text is transmitted, is classified;

a process of receiving, from the streamer terminal, text-of-attention that the streamer is determined to pay attention to; and a process of transmitting the text-of-attention to viewer terminals that are classified in a group other than the group into which the viewer terminal, from which the text-of-attention is transmitted, is classified.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure can suitably be adopted in a live stream that enables viewers having various backgrounds to enjoy a text chat and can provide a chance to enliven communication among the viewers.

REFERENCE SIGNS LIST 11, 12, 13, 14, 15, 21, 22, 23, 24, 25 Text
12', 22' Text-of-attention
101 Delivery system
102 Streamer terminal
103, 103a, 103b, 103c, 103d, 103e, 103f Viewer terminal
104 Delivery server
121 Delivery-side receiver
122 Delivery-side display
123 Determiner
124 Executor
125 Delivery-side group registerer
126 Operation acceptor
131 Acceptor
132 Viewing-side transmitter
133 Viewing-side receiver
134 Viewing-side display
135 Viewing-side group registerer
136 Viewing request transmitter
141 Group specifier
142 User registerer
143 Willingness-to-buy determiner
144 Server-side receiver
145 Server-side transmitter
801 Group name display portion
802a, 802b, 802c, 802d, 802e, 802f Viewer icon
803 Link button
804 Chat display area
X Live video

The invention claimed is:

1. A delivery system, comprising:
a plurality of viewer terminals to which live video is delivered, the plurality of viewer terminals each comprising one or more processors, and
a streamer terminal comprising one or more processors and used by a streamer that delivers the live video, wherein
at least one of the one or more processors included in the streamer terminal executes:
  a delivery-side reception process of receiving, from the viewer terminal, text posted from a viewer using the viewer terminal;
  a delivery-side display process of making, when the text is received, the text appear in a screen;
  a determination process of determining whether the streamer pays attention to the text, until the text exits from within the screen; and
  an execution process of executing a predetermined attention process on text-of-attention that the streamer is determined to pay attention to,
the viewer terminals are classified into any one of a plurality of groups,
at least one of the one or more processors included in each viewer terminal executes:
  an acceptance process of accepting text posted from a viewer using the each terminal;
  a viewing-side transmission process of transmitting the accepted text to the streamer terminal and another viewing terminals belonging to a group into which the each terminal is classified;
  a viewing-side reception process of receiving text transmitted from another viewer terminal belonging to the group into which the each terminal is classified; and
  a viewing-side display process of making the received text appear in a screen,
in the attention process of the streamer terminal, the text-of-attention is transmitted to viewer terminals that are classified in a group other than the group into which the viewer terminal, from which the text-of-attention is transmitted, is classified, and
when the text-of-attention is received in each terminal of the viewer terminals, the received text-of-attention is made to appear in the screen.

2. The delivery system according to claim 1, further comprising:
a delivery server comprising one or more processors and cooperating with the streamer terminal, wherein
at least one of the one or more processors included in the delivery server executes:
  a server-side reception process of receiving, from the viewer terminal, text posted from the viewer using the viewer terminal; and
  a server-side transmission process of transmitting, when the text is received, the text to the streamer terminal and another viewer terminals belonging to a group into which the viewer terminal, from which the text is transmitted, is classified,
in the attention process of the streamer terminal, the text-of-attention is further transmitted to the delivery server,
in the server-side reception process of the delivery server, the text-of-attention is further received,
in the server-side transmission process, the text-of-attention is further transmitted to viewer terminals that are classified in a group other than the group into which the viewer terminal, from which the text-of-attention is transmitted, is classified,
in the viewing-side reception process of each terminal of the viewer terminals, the text-of-attention transmitted from the delivery server is further received, and
in the viewing-side display process, the received text-of-attention is further made to appear in the screen.

3. The delivery system according to claim 1, further comprising:
a delivery server comprising one or more processors and cooperating with the streamer terminal, wherein
by at least one of the one or more processors included in the delivery server, the delivery server executes:
  a server-side reception process of receiving, from the viewer terminal, text posted from the viewer using the viewer terminal; and
  a server-side transmission process of transmitting, when the text is received, the text to the streamer terminal and another viewer terminals belonging to a group into which the viewer terminal, from which the text is transmitted, is classified, in the attention process of the streamer terminal, the text-of-attention is further transmitted to the delivery server, in the server-side reception process of the delivery server, the text-of-attention is further received, in the server-side transmission process, the text-of-attention is further transmitted to all viewer terminals that are classified in any one of the groups, in the viewing-side reception process of each terminal of the viewer terminals, the text-of-attention transmitted from the delivery server is further received, and in the viewing-side display process, the text-of-attention is further made to appear in the screen, when the text-of-attention does not appear in the screen before a time point when the text-of-attention is received.

4. The delivery system according to claim 1, further comprising:

a delivery server comprising one or more processors and cooperating with the streamer terminal, wherein at least one of the one or more processors included in each of the viewer terminals further executes a viewing request transmission process of transmitting, to the delivery server, a viewing request that designates the live video that is delivered by the streamer terminal, and at least one of the one or more processors included in the delivery server further executes a group specifying process of specifying, upon receiving the viewing request from the viewer terminal, a group to which the viewer terminal is to belong, among a plurality of groups.

5. The delivery system according to claim 4, wherein at least one of the one or more processors included in the delivery server further executes a user registration process of registering register information relating to the viewer using the viewer terminal, and in the group specifying process, the group to which the viewer terminal used by the viewer is to belong is specified based on the register information registered in the user registration process.

6. The delivery system according to claim 5, wherein the register information registered in the user registration process includes a purchase history of goods or services purchased by the viewer in a past, and in the group specifying process, the group to which the viewer terminal used by the viewer is to belong is specified based on the purchase history included in the register information.

7. The delivery system according to claim 6, wherein at least one of the one or more processors included in the delivery server further executes a willingness-to-buy determination process of determining whether a willingness-to-buy of goods or services by the viewer is high, based on the purchase history, and in the group specifying process, the group to which the viewer terminal used by the viewer is to belong is specified based on the willingness-to-buy of the viewer determined in the willingness-to-buy determination process.

8. The delivery system according to claim 5, wherein the register information registered in the user registration process includes a viewing history of motion video by the viewer, and in the group specifying process, the group to which the viewer terminal used by the viewer is to belong is specified based on the viewing history included in the register information.

9. The delivery system according to claim 5, wherein the register information registered in the user registration process includes a domicile of the viewer, and in the group specifying process, the group to which the viewer terminal used by the viewer is to belong is specified based on the domicile of the viewer included in the register information.

10. The delivery system according to claim 1, wherein at least one of the one or more processors included in the streamer terminal further executes an operation acceptance process of accepting an operation by the streamer using the streamer terminal, and in the determination process, whether the streamer pays attention to the text is determined based on the operation by the streamer accepted in the operation acceptance process.

11. The delivery system according to claim 10, wherein in the operation acceptance process, a pressing operation on the text that is made to appear in the delivery-side display process is accepted, and in the determination process, that the streamer pays attention to the text is determined when the pressing operation on the text is accepted in the operation acceptance process.

12. The delivery system according to claim 10, wherein in the operation acceptance process, a result of speech recognition of a speech of the streamer is compared with each text appearing in the screen by the delivery-side display process, and when the result and each text are coincident or similar, that the streamer pays attention to the coincident or similar text is determined.

13. A delivery method in a delivery system including a plurality of viewer terminals to which live video is delivered, and a streamer terminal used by a streamer that delivers the live video, the delivery method comprising:

by the streamer terminal, receiving, from the viewer terminal, text posted from a viewer using the viewer terminal;

making, when the text is received, the text appear in a screen;

determining whether the streamer pays attention to the text, until the text exits from within the screen; and executing a predetermined attention process on text-of-attention that the streamer is determined to pay attention to, by each of the viewer terminals classified into any one of a plurality of groups, accepting text posted from a viewer using the each terminal;

transmitting the accepted text to the streamer terminal and another viewing terminals belonging to a group into which the each terminal is classified;

receiving text transmitted from another viewer terminal belonging to the group into which the each terminal is classified; and making the received text appear in a screen, by the streamer terminal, transmitting, in the attention process, the text-of-attention to viewer terminals that are classified in a group other than the group into which the viewer terminal, from which the text-of-attention is transmitted, is classified, and by each of the viewer terminals, making, when the text-of-attention is received, the received text-of-attention appear in the screen.

14. A delivery server communicably connected to a plurality of viewer terminals classified in any one of a plurality of groups, and to a streamer terminal used by a streamer that delivers live video, the live video being delivered to the viewer terminals, the delivery server comprising one or more processors,
wherein at least one of the one or more processors executes:
- a process of receiving, from the viewer terminal, text posted from a viewer using the viewer terminal;
- a process of transmitting, when the text is received, the text to the streamer terminal and another viewer terminals belonging to a group into which the viewer terminal, from which the text is transmitted, is classified;
- a process of receiving, from the streamer terminal, text-of-attention that the streamer is determined to pay attention to; and
- a process of transmitting the text-of-attention to viewer terminals that are classified in a group other than the group into which the viewer terminal, from which the text-of-attention is transmitted, is classified.

* * * * *